Nov. 12, 1940.  J. W. HARVEY  2,220,878

FISH LURE WINDER

Filed Aug. 12, 1938

INVENTOR
James W. Harvey
BY
ATTORNEY

Patented Nov. 12, 1940

2,220,878

UNITED STATES PATENT OFFICE 2,220,878

FISH LURE WINDER

James W. Harvey, Lakeville, Conn., assignor to Starr Allyn Harvey, Lakeville, Conn.

Application August 12, 1938, Serial No. 224,433

5 Claims. (Cl. 242—140)

This invention relates to a tool for winding artificial fish lures, flies, or bait with silk, gut, wire, or other thread-like material.

The main object is to provide a device that is simple, inexpensive and efficient.

Another object is to provide a device that will wind bait very quickly.

Another object is to provide a device that will wind bait much more tightly than can be done by hand.

Another object is to provide a device which can be operated at varied tensions to account for different materials and types of winding.

An object of this invention is to provide a device which can carry one or more spools of material.

A further object is to provide a device capable of use with fine silk, gut, or other materials that may differ in thickness and smoothness.

Another object is to provide a device capable of fast loading and unloading.

Another object is to provide a device which can wind with more than one material simultaneously.

Another object is to provide a device which will hold spools of different length and diameter.

In the preferred form, the winder consists of a handle to one end of which a smooth round eye or ring such as an agate-lined "stirrup" tip for fish rods, is attached, and the other end of which is bent so that a spool thereon lies at an angle to the handle. Also attached to the handle and extending toward the spool is a spring means carrying a bar or bars parallel to the spool axis. This spring pressed bar acts as a brake to keep tension on the spool. The end of this bar that is next to the end of the spool axis is bent over to hold the spool on its axis.

Figure 1:
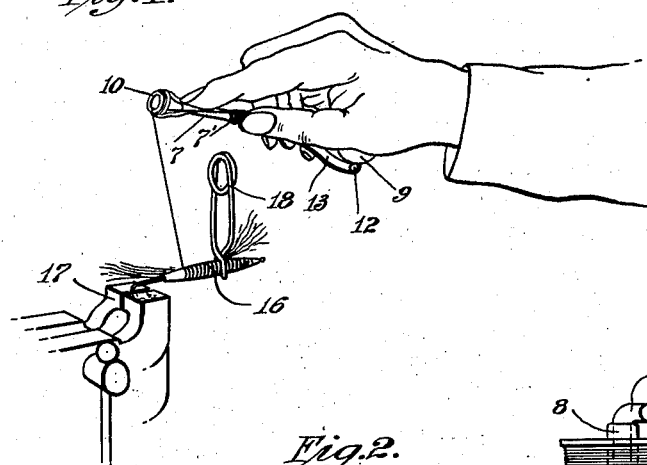
Fig. 1 is a perspective view showing the operation of the winder.
Figure 2:
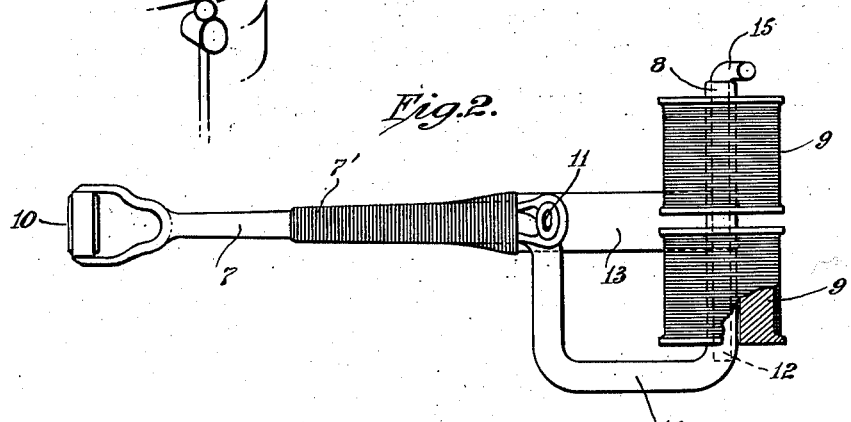
Fig. 2 is a plan view of a winder.
Figure 3:
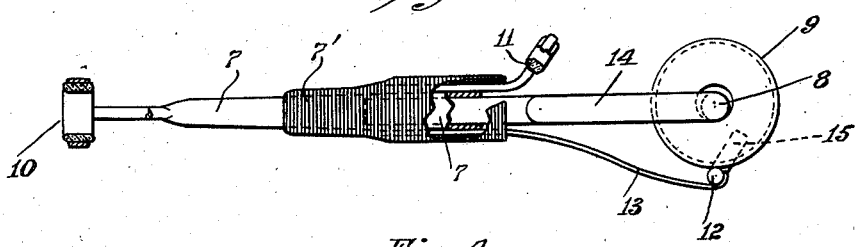
Fig. 3 is a side view of a winder.
Figure 4:
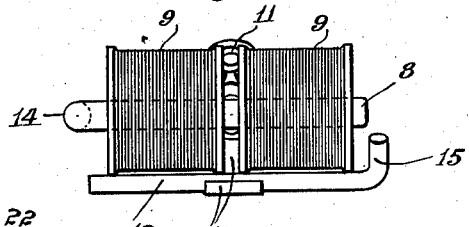
Fig. 4 is an end view of a winder.

The handle 7 has one end bent transversely to form a bearing or shaft 8 to support one or more spools 9 of gut, silk, wire or other thread. The guide 10 at the other end is preferably of smooth agate in the form of a ring and supported by side members like a stirrup in such a manner that the thread can be easily threaded through. A second guide 11 is also preferably interposed between the spool and the tip guide. A brake bar 12 is carried by a spring 13 secured to the handle and presses against the flanges of the spools. The offset portion 14 serves as a part of the handle and as a guard or stop for one end of the spool or spools and the bent end 15 of the brake bar serves as a guard or stop for the other end. A spool can be attached or removed only by retracting the brake bar 12 and its hook-like end 15.

In winding a fly or other lure the hook or a part of the body 16 is usually held in a vise 17 and the winding tool is held in the hand in the most convenient manner and rotated around the body 16. Frequently a clip 18 is necessary to hold back part of the hairs, feathers, hackle or other parts which are being attached to the hook. The tension of the spring 13 must be great enough so that at the time of fixing these feathers, hairs or hackle to the hook, the tool can be left hanging by the thread, thereby maintaining tension on the thread and leaving both hands of the operator free to do the other work without getting the thread tangled up. Otherwise, the tension is controlled and increased as required by the pressure of the fingers on the spool and brake and at times on the thread itself.

It is very important that the outer face of the guide 10 be in a plane at right angles to the axis of the handle, otherwise the thread is likely to be twisted around the end of the tool as well as on the lure, which occasions confusion, delay and poor results. This guide edge 10 also makes it possible not only to pull the thread toward the hand in winding but also to push it away so as to lay the thread tightly in either direction, especially on tapered bodies. This guide edge must be smooth in order to produce even winding. As can be seen in Fig. 1, tension on the thread is maintained at a sharp angle, and for this reason the lip of the guide edge should also be curved to prevent cutting the material.

The spring 13 and the rings 10 and 11 are fastened to the handle in any suitable manner, for instance by winding 7' such as is used in fastening guide rings to fish rods.

The arm 14 is long enough to accommodate large spools as well as small ones.

The ordinary hand method of winding flies and lures is a slow, laborious, inexact and expensive task. Use of this invention speeds up the operation three to four times, and this speed is possible to maintain easily, whereas the hand method tires the muscles and burns the fingers. Much greater accuracy is obtained by using this invention than is possible by guiding the fine strands with the fingers alone. It is impossible to approach the tension of this invention with the hand method. These are the more obvious reasons why the product of this improved tool is easier to make, less expensive, more quickly made and of far better quality and durability than has been possible heretofore. In fact, it is possible with this winder to wind hard gut, artificial gut, and wire, which are almost impossible to wind with the fingers alone as the required tension is so severe as to cut the fingers. By the use of my invention an operator can be taught to wind flies, artificial minnows and the like in a few hours so as to easily exceed the speed of experienced operators using the bare hand method of winding.

Figure 5:
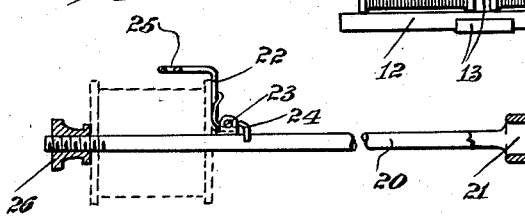
Fig. 5 is a side view of a modified form.

A modified form of device, such as is shown in Fig. 5, has a straight handle or shaft 20 with a guide ring 21 attached at one end as mentioned above. The other end in this case is fitted with a nut or removable stop 26. Arm 22 with a guide eyelet 25 attached is hingedly connected to the shaft. Incorporated with the hinge is a spring 23, keeping the arm 22 permanently tensioned toward the spool so that it presses against the spool end or flange in such a way as to act as a brake. This is a simpler construction, and may be used in a manner similar to the form first described.

The end of the arm 22 extends around the flange of the spool so as to hold the eyelet 25 at the side of the spool to give a more even feeding of the wire or other material through the tool. In winding with this form of tool, the hand can press against the eyelet 25 or any part of the arm 22, and tension can be regulated at will by pressure on either of these parts or upon the material being used for the winding. The spring action is quite important to maintain tension on the thread when the tool is suspended from the work while inserting feathers, hairs, or the like.

I claim:

1. A fish lure winder comprising a shaft having a transverse spool supporting spindle at one end and an open thread guiding ring at the other end with its outlet edge in a plane at right angles to the axis of the shaft, a brake rod resiliently and retractably carried by the shaft and coacting with the periphery of a spool on said spindle, the brake rod having one end turned to provide a stop to prevent the spool from accidentally slipping from the bearing.

2. A tool for winding fish lures and the like, comprising a body portion serving as a handle, a support for a rotatable spool at an end portion of the tool, an annular guide eyelet in a plane substantially normal to planes through the longitudinal axis of the tool, located at the extreme opposite end of the tool from said spool support, and open on both sides to be accessible for insertion of thread or the like directly through said eyelet, and a readily retractable friction brake means including a brake rod at least in part generally parallel to said spool support and adapted to engage a peripheral portion of a spool on said support, said friction brake means also including a spring cooperating with said body portion and brake rod for exerting a continual braking action upon a spool on said support, said brake means being adapted when the tool is held in the hand and in operation, to receive manual pressure directly upon it and augment the frictional braking effect of the spring alone without the hand directly engaging the spool or material wound thereon.

3. A tool for winding fish lures and the like comprising a body portion serving as a handle, a generally U-shaped portion extending laterally of said body portion and connected therewith, the arm of said U-shaped portion remote from the body portion being longer than the arm connected to the body portion, a spool being adapted to be rotatably carried by said longer arm, a brake rod generally parallel to said longer arm, a leaf spring secured to said body portion and carrying said brake rod for continual cooperation with a spool on said longer arm, said brake rod having at the outer end portion of said longer arm an abutment for limiting longitudinal movement of a spool in at least one direction on said arm, said spring being sufficiently flexible for the brake rod and its abutment to be readily retracted far enough away from a spool on the longer arm to allow the spool to be slid off said arm and another put in place thereon.

4. A tool for winding fish lures and the like comprising a body portion consisting of a handle, a support for a rotatable spool at an end portion of the tool, a guide eyelet in a plane substantially normal to the axis of said body portion, said eyelet being open on opposite sides for ready insertion of thread or the like therethrough and located at the extreme opposite end of said tool from said spool support with nothing extending beyond said eyelet whereby said tool may be circumscribed about the work in wrapping the same without danger of the thread or the like being caught on any projection from said tool beyond said eyelet, friction brake means exerting a continual braking action upon a spool on said support in excess of a pull on the material wound on said spool due to gravity upon the tool when suspended by thread or the like coming from said tool, said brake means including a brake rod, and a spring cooperating with said body portion and brake rod for moving the brake rod into contact with said spool, at least a portion of said brake rod constituting an abutment to limit longitudinal movement of a spool on said support in at least one direction, a second eyelet open on opposite sides for direct insertion of thread or the like from said spool, said second eyelet being located intermediate the ends of said tool, the thread or the like being exposed as it passes from said spool and intermediate the ends of said tool except where it passes through said eyelets and said thread or the like extending in a substantially straight line between said eyelets and in another substantially straight line from said spool to said second eyelet, at least a portion of said brake means being adapted to receive manual pressure during use from an operator's finger or hand to augment the frictional braking action of said means.

5. A tool for winding fish lures and the like comprising a body portion serving as a handle, a laterally extending support for a rotatable spool adjacent one end portion of the tool, a lateral projection extending from said body portion and carrying said spool support with the axis of said support normal to the axis of said body portion, a guide eyelet arranged in a plane substantially normal to the longitudinal axis of the tool, located at the extreme opposite end of the tool from said spool support, and open on opposite sides to be accessible for insertion of thread or the like directly through said eyelet, a second guide eyelet adjacent said lateral projection supported at one side of said body portion, and open on opposite sides for insertion of thread or the like directly from a spool on said support through the second and first eyelets with such thread or the like exposed between said spool and first eyelet except for the second mentioned eyelet, and a friction brake means including a leaf spring secured to said body portion adjacent but on the opposite side from said second eyelet, said leaf spring supporting a brake member for cooperation with a spool on said support.

JAMES W. HARVEY.

CERTIFICATE OF CORRECTION.

Patent No. 2,220,878. November 12, 1940.

JAMES W. HARVEY.

It is hereby certified that error appears in the above numbered patent requiring correction as follows: In the grant, line 12, for the words "his heirs" read --her heirs--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.